(12) United States Patent
Miyabe

(10) Patent No.: US 11,872,788 B2
(45) Date of Patent: Jan. 16, 2024

(54) MULTILAYERED ARTICLE AND MULTILAYERED CONTAINER

(71) Applicant: Mitsubishi Gas Chemical Company, Inc., Tokyo (JP)

(72) Inventor: Takanori Miyabe, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 13 days.

(21) Appl. No.: 17/049,876

(22) PCT Filed: Apr. 22, 2019

(86) PCT No.: PCT/JP2019/017036
§ 371 (c)(1),
(2) Date: Oct. 22, 2020

(87) PCT Pub. No.: WO2019/208501
PCT Pub. Date: Oct. 31, 2019

(65) Prior Publication Data
US 2021/0237414 A1    Aug. 5, 2021

(30) Foreign Application Priority Data

Apr. 24, 2018  (JP) ................................. 2018-082857

(51) Int. Cl.
*B32B 27/34* (2006.01)
*B32B 27/08* (2006.01)
(Continued)

(52) U.S. Cl.
CPC .............. *B32B 27/34* (2013.01); *B32B 27/08* (2013.01); *B32B 27/36* (2013.01); *B65D 1/0215* (2013.01);
(Continued)

(58) Field of Classification Search
CPC ........... C08L 2205/025; C08L 2205/03; C08L 2205/035; C08L 2205/04; C08L 77/02;
(Continued)

(56) References Cited

U.S. PATENT DOCUMENTS

| 4,433,136 A | 2/1984 | Miyamoto et al. |
| 4,438,257 A | 3/1984 | Miyamoto et al. |

(Continued)

FOREIGN PATENT DOCUMENTS

| CN | 101331021 A | 12/2008 |
| CN | 101360601 A | 2/2009 |

(Continued)

OTHER PUBLICATIONS

Office Action dated Feb. 16, 2022, in corresponding Chinese Patent Application No. 201980027765.5.
(Continued)

*Primary Examiner* — Lee E Sanderson
(74) *Attorney, Agent, or Firm* — Fitch, Even, Tabin & Flannery LLP

(57) ABSTRACT

Provided are a multilayered article and a multilayered container excelling in oxygen barrier properties, delamination resistance, and transparency. The multilayered article has a polyester resin layer and a barrier layer. The polyamide resin contained in the barrier layer includes (A) a polyamide resin derived from xylylenediamine and adipic acid, (B) a polyamide resin derived from xylylenediamine, a linear aliphatic dicarboxylic acid, and isophthalic acid, and as necessary, (C) a polyamide resin derived from hexamethylenediamine, isophthalic acid, and terephthalic acid, and (D) an aliphatic polyamide resin. In the barrier layer, a ratio of the mass of the polyamide resin (A) to the total mass of the polyamide resin (B) and the polyamide resin (C) is from 98:2 to 15:85, the total content of the polyamide resin (A) and the poly-
(Continued)

(1)   (2)   (3)   (4)   (5)

amide resin (B) is 60 mass % or more, the content of the polyamide resin (B) is from 1 to 65 mass %, and the content of the aliphatic polyamide resin (D) is from 3 to 40 mass %.

20 Claims, 1 Drawing Sheet

(51) Int. Cl.
*B32B 27/36* (2006.01)
*B65D 1/02* (2006.01)
*B65D 65/40* (2006.01)
*C08G 69/26* (2006.01)
*C08L 77/06* (2006.01)

(52) U.S. Cl.
CPC ........... *B65D 65/40* (2013.01); *C08G 69/265* (2013.01); *C08L 77/06* (2013.01); *B32B 2250/03* (2013.01); *B32B 2250/40* (2013.01); *B32B 2439/60* (2013.01); *C08L 2205/025* (2013.01); *C08L 2205/035* (2013.01)

(58) Field of Classification Search
CPC .......... C08L 77/04; C08L 77/06; C08L 77/10; B32B 27/08; B32B 27/34; B32B 2439/60; B32B 1/02; B32B 1/04; B32B 1/06; B32B 1/08; Y10T 428/31736; C09G 69/02; C09G 69/10; C09G 69/12; C09G 69/14; C09G 69/16; C09G 69/26; C09G 69/32; C09G 69/36; B65D 1/0215
USPC .......................................... 428/36.91, 475.2
See application file for complete search history.

(56) References Cited

U.S. PATENT DOCUMENTS

| | | | |
|---|---|---|---|
| 4,908,272 A | 3/1990 | Harada et al. | |
| 5,175,238 A * | 12/1992 | Matlack | C08L 77/00 528/340 |
| 2005/0009976 A1* | 1/2005 | Akkapeddi | B32B 27/36 524/445 |
| 2006/0197246 A1 | 9/2006 | Hale et al. | |
| 2007/0154668 A1* | 7/2007 | Rhee | C08J 5/18 525/432 |
| 2009/0277858 A1 | 11/2009 | Mitadera et al. | |
| 2010/0233401 A1 | 9/2010 | Mitadera et al. | |
| 2011/0036850 A1* | 2/2011 | Sugai | B65D 1/0215 220/660 |
| 2012/0065327 A1 | 3/2012 | Ogawa et al. | |
| 2014/0127433 A1 | 5/2014 | Arakawa et al. | |
| 2019/0010328 A1 | 1/2019 | Oda et al. | |
| 2019/0070072 A1 | 3/2019 | Arakawa et al. | |
| 2020/0048441 A1 | 2/2020 | Kato et al. | |
| 2020/0079959 A1 | 3/2020 | Sato et al. | |

FOREIGN PATENT DOCUMENTS

| | | | |
|---|---|---|---|
| CN | 102026880 A | | 4/2011 |
| EP | 2261124 A1 | | 12/2010 |
| JP | S60-232952 A | | 11/1985 |
| JP | S63-267549 A | | 11/1988 |
| JP | 06287298 A | * | 10/1994 |
| JP | H07-223305 A | | 8/1995 |
| JP | 2006-111718 A | | 4/2006 |
| JP | 2008-531827 A | | 8/2008 |
| JP | 2009-035286 A | | 2/2009 |
| JP | 2016-169027 A | | 9/2016 |
| TW | 200514825 A | | 5/2005 |
| TW | 201741141 A | | 12/2017 |
| WO | 2005/012430 A1 | | 2/2005 |
| WO | 2008/146803 A1 | | 12/2008 |
| WO | 2013/002075 A1 | | 1/2013 |
| WO | 2017/115685 A1 | | 7/2017 |
| WO | 2017/141969 A1 | | 8/2017 |
| WO | 2018/070194 A1 | | 4/2018 |
| WO | 2018/180401 A1 | | 10/2018 |

OTHER PUBLICATIONS

International Preliminary Report on Patentability and Written Opinion for PCT/JP2019/017036, dated Jul. 30, 2019, and English Translation submitted herewith (11 pages).
International Search Report for PCT/JP2019/017036, dated Jul. 30, 2019, and English Translation submitted herewith (5 pages).
EPO; Application No. 19793120.7; Office Action dated Dec. 6, 2022, 5 pages.
EPO; Application No. 19793120.7; Extended European Search Report dated May 14, 2021, 7 pages.
International Preliminary Report on Patentability and Written Opinion for PCT/JP2019/017035, dated Jul. 30, 2019, and English Translation submitted herewith, 12 pages.
International Search Report for PCT/JP2019/017035, dated Jul. 30, 2019, and English Translation submitted herewith, 5 pages.

* cited by examiner

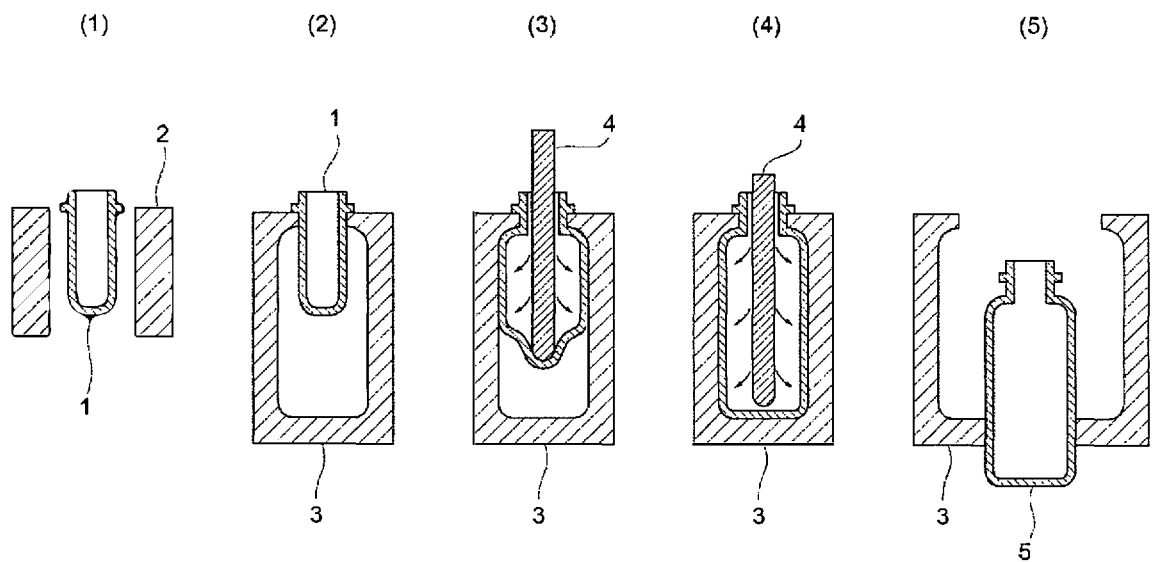

MULTILAYERED ARTICLE AND MULTILAYERED CONTAINER

CROSS-REFERENCE TO RELATED APPLICATIONS

This application is a U.S. national phase application filed under 35 U.S.C. § 371 of International Application Number PCT/JP2019/017036, filed Apr. 22, 2019, designating the United States, which claims priority from Japanese Application Number 2018-082857, filed Apr. 24, 2018.

FIELD OF THE INVENTION

The present invention relates to a multilayered article and a multilayered container.

BACKGROUND OF THE INVENTION

Multilayered articles and multilayered containers that use a polyester resin as a resin constituting an outer layer and an inner layer, and have a barrier layer formed from a polyamide resin between the outer layer and the inner layer have been examined in the past (Patent Documents 1 and 2).

CITATION LIST

Patent Documents

Patent Document 1: JP 2016-169027 A
Patent Document 2: JP 60-232952 A

SUMMARY OF INVENTION

However, when such multilayered articles and multilayered containers having an outer layer and an inner layer formed from a polyester resin, and a barrier layer (intermediate layer) formed from a polyamide resin were examined by the present inventors, it was found that the oxygen barrier property is inferior depending on the type of polyamide resin.

When a polyamide resin (MXD6) containing meta-xylylenediamine and adipic acid is used as the polyamide resin, a multilayered article and a multilayered container excelling in oxygen barrier properties can be obtained. However, when an aliphatic polyamide resin is compounded to improve delamination resistance, the oxygen barrier property and transparency may become inferior.

Thus, an object of the present invention is to solve the problems described above by providing a multilayered article and a multilayered container having an excellent balance between oxygen barrier properties, delamination resistance, and transparency.

The inventors of the present invention conducted an examination on the basis of the problems described above, and as a result, discovered that the problems described above can be solved by blending three or more types of predetermined polyamide resins in a well-balanced manner into the barrier layer. Specifically, the problems described above are solved by the following means <1>, and preferably by the following means <2> to <11>.

<1> A multilayered article having a layer containing a polyester resin as a main component and a layer containing a polyamide resin as a main component, the polyamide resin included in the layer containing a polyamide resin as a main component including: a polyamide resin (A) including a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid; and a polyamide resin (B) including a structural unit derived from a diamine and a structural unit derived from a dicarboxylic acid, 70 mol % or more of the structural unit derived from a diamine being derived from xylylenediamine, and of the structural unit derived from a dicarboxylic acid, from 30 to 65 mol % being derived from an α,ω-linear aliphatic dicarboxylic acid having from 4 to 20 carbons, and from 70 to 35 mol % being derived from isophthalic acid, a total of which does not exceed 100 mol %; the polyamide resin included in the layer containing a polyamide resin as a main component including or not including a polyamide resin (C) including a structural unit derived from a diamine and a structural unit derived from a dicarboxylic acid, 70 mol % or more of the structural unit derived from a diamine being derived from hexamethylenediamine, 55 mol % or more of the structural unit derived from a dicarboxylic acid being derived from isophthalic acid, and 15 mol % or more of the structural unit derived from a dicarboxylic acid being derived from terephthalic acid; and the polyamide resin included in the layer containing a polyamide resin as a main component including an aliphatic polyamide resin (D); wherein, in the layer containing a polyamide resin as a main component, a ratio of a mass of the polyamide resin (A) to a total mass of the polyamide resin (B) and the polyamide resin (C) is from 98:2 to 15:85; a total content of the polyamide resin (A) and the polyamide resin (B) is not less than 60 mass % of the layer containing a polyamide resin as a main component, a content of the polyamide resin (B) is from 1 to 65 mass % of the layer containing a polyamide resin as a main component, and a content of the aliphatic polyamide resin (D) is from 3 to 40 mass % of the layer containing a polyamide resin as a main component.

<2> The multilayered article according to <1>, wherein the aliphatic polyamide resin (D) includes polyamide 6.

<3> The multilayered article according to <1> or <2>, wherein at least 70 mol % of the structural unit derived from a diamine in the polyamide resin (A) is derived from meta-xylylenediamine.

<4> The multilayered article according to any one of <1> to <3>, where, of the structural unit derived from a dicarboxylic acid in the polyamide resin (B), from 30 to 65 mol % is derived from adipic acid, and from 70 to 35 mol % is derived from isophthalic acid.

<5> The multilayered article according to any one of <1> to <3>, wherein, of the structural unit derived from a dicarboxylic acid in the polyamide resin (B), from 30 to 59 mol % is derived from adipic acid, and from 70 to 41 mol % is derived from isophthalic acid.

<6> The multilayered article according to any one of <1> to <5>, wherein the polyamide resin (B) is an amorphous polyamide resin.

<7> The multilayered article according to <1>, wherein at least 90 mol % of the structural unit derived from a diamine in the polyamide resin (A) is derived from meta-xylylenediamine; of the structural unit derived from a dicarboxylic acid in the polyamide resin (B), from 30 to 65 mol % is derived from adipic acid, and from 70 to 35 mol % is derived from isophthalic acid; and 80 mass % or more of the aliphatic polyamide resin (D) is polyamide 6.

<8> The multilayered article according to any one of <1> to <7>, further including a layer containing a second polyester resin as a main component, the multilayered article including the layers positioned in an order of the layer containing a polyester resin as a main component, the layer containing a polyamide resin as a main component, and the layer containing a second polyester resin as a main component.

<9> The multilayered article according to any one of <1> to <8>, wherein the multilayered article is stretched.

<10> A multilayered container containing the multilayered article as in any one of <1> to <9>.

<11> The multilayered container according to <10>, wherein the container is a bottle.

According to the present invention, a multilayered article and a multilayered container having an excellent balance between oxygen barrier properties, delamination resistance, and transparency can be provided.

BRIEF DESCRIPTION OF DRAWINGS

FIG. 1 is a schematic view illustrating a method of manufacturing a multilayered container through cold parison molding.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

In the present invention, the term amorphous resin means a resin that does not have a definite melting point, and more specifically, means a resin having a crystal melting enthalpy ΔHm of less than 5 J/g, preferably 3 J/g or less, and more preferably 1 J/g or less. The crystal melting enthalpy is measured in accordance with a method described in the examples below.

The multilayered article of the present invention includes: a layer containing a polyester resin as a main component (hereinafter, a "polyester resin layer"), and a layer containing a polyamide resin as a main component (hereinafter, a "barrier layer"); the multilayered article being characterized in that the polyamide resin included in the layer containing a polyamide resin as a main component includes: a polyamide resin (A) including a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid; and a polyamide resin (B) including a structural unit derived from a diamine and a structural unit derived from a dicarboxylic acid, 70 mol % or more of the structural unit derived from a diamine being derived from xylylenediamine, and of the structural unit derived from a dicarboxylic acid, from 30 to 65 mol % being derived from an α,ω-linear aliphatic dicarboxylic acid having from 4 to 20 carbons, and from 70 to 35 mol % being derived from isophthalic acid, a total of which does not exceed 100 mol %); and may include or not include a polyamide resin (C) including a structural unit derived from a diamine and a structural unit derived from a dicarboxylic acid, 70 mol % or more of the structural unit derived from a diamine being derived from hexamethylenediamine, 55 mol % or more of the structural unit derived from a dicarboxylic acid being derived from isophthalic acid, and 15 mol % or more of the structural unit derived from a dicarboxylic acid being derived from terephthalic acid; and includes an aliphatic polyamide resin (D); wherein, in the layer containing a polyamide resin as a main component, a ratio of a mass of the polyamide resin (A) to a total mass of the polyamide resin (B) and the polyamide resin (C) is from 98:2 to 15:85; a total content of the polyamide resin (A) and the polyamide resin (B) is not less than 60 mass % of the layer containing a polyamide resin as a main component, a content of the polyamide resin (B) is from 1 to 65 mass % of the layer containing a polyamide resin as a main component, and a content of the aliphatic polyamide resin (D) is from 3 to 40 mass % of the layer containing a polyamide resin as a main component. Such a configuration can provide a multilayered article and a multilayered container excelling in oxygen barrier properties, transparency, and delamination resistance.

Specifically, the oxygen barrier properties can be improved by setting the total content of the polyamide resin (A) and the polyamide resin (B), which are polyamide resins with high oxygen barrier properties, to at least 60 mass % of the barrier layer. Furthermore, the delamination resistance can be improved by setting the mass ratio of the total of the polyamide resin (B) and the polyamide resin (C), which are polyamide resins excelling in delamination resistance, to the polyamide resin (A) to a certain ratio or higher, and further, by adjusting the content of the aliphatic polyamide resin (D) to a range from 3 to 40 mass % of the barrier layer. Furthermore, transparency can be improved by setting the content of the polyamide resin (B), which is a polyamide resin having excellent transparency, to a range from 1 to 65 mass % of the barrier layer.

The present invention will be described in detail below.

Layer Containing Polyester Resin as a Main Component (Polyester Resin Layer)

The polyester resin layer contains a polyester resin as a main component. Here, the term "main component" means that the polyester resin is the component with the largest content amount amongst components contained in the polyester resin layer. The amount of polyester resin contained in the polyester resin layer is preferably 80 mass % or more, more preferably 90 mass % or more, even more preferably 95 mass % or more, and yet even more preferably 98 mass % or more.

The inherent viscosity of the polyester resin is preferably from 0.50 to 0.90 dL/g.

For polyester resins, one kind of polyester resin may be contained alone, or two or more kinds of polyester resins may be contained. In a case where two or more types thereof are contained therein, the total amount is preferably within the range described above.

Polyester resins including both a first embodiment and a second embodiment described below are also given as examples of embodiments of the present invention.

The first embodiment of the polyester resin included in the polyester resin layer is a polyester resin having a melting point.

The melting point of the polyester resin of the first embodiment is preferably from 100 to 300° C., more preferably from 200 to 300° C., and even more preferably from 220 to 295° C. The melting point is measured in accordance with a method described in the examples below. The same applies to the melting points of the other constituent components.

The glass transition temperature of the polyester resin of the first embodiment is preferably less than 90° C., more preferably 85° C. or lower, and even more preferably 80° C. or lower. The lower limit of the glass transition temperature is preferably 60° C. or higher, more preferably 65° C. or higher, and even more preferably 70° C. or higher. The use of such a polyester resin tends to provide more excellent molding processability of the multilayered article. The glass transition temperature is measured in accordance with a method described in the examples below. The same applies to the glass transition temperatures of the other components described below.

Such a polyester resin is a polyester resin constituted by a structural unit derived from a dicarboxylic acid and a structural unit derived from a diol, in which at least 80 mol % (preferably 85 mol % or more, more preferably 90 mol % or more, and even more preferably 95 mol % or more) of the structural unit derived from a dicarboxylic acid is derived from at least one type selected from terephthalic acid and esters thereof, and at least 80 mol % (preferably 85 mol % or more, more preferably 90 mol % or more, and even more preferably 95 mol % or more) of the structural unit derived from a diol is derived from ethylene glycol. Here, the polyester resin of the first embodiment is formed from a structural unit derived from a dicarboxylic acid and a structural unit derived from a diol, but may also include a structural unit besides the structural unit derived from a dicarboxylic acid and the structural unit derived from a diol, or other moieties such as terminal groups. Typically 95 mass % or more, and preferably 98 mass % or more of the polyester resin used in the present invention is constituted by the structural unit derived from a dicarboxylic acid and the structural unit derived from a diol. The same applies to the other polyester resins.

For details on the polyester resin that can be used in the first embodiment, the disclosure of paragraphs [0064] to [0080] of JP 2016-169027 A, the contents of which are incorporated herein, can be referenced.

The second embodiment of the polyester resin included in the polyester resin layer is an amorphous polyester resin. A multilayered article with excellent transparency is obtained by using an amorphous resin.

The glass transition temperature of the amorphous polyester resin is preferably 90° C. or higher, and more preferably 100° C. or higher. The upper limit of the glass transition temperature is preferably 155° C. or lower, and more preferably 150° C. or lower. A multilayered article with more superior heat resistance is obtained by using such a polyester resin.

One example of the amorphous polyester resin is a polyester resin constituted by a structural unit derived from a dicarboxylic acid and a structural unit derived from a diol, in which at least 80 mol % (preferably at least 85 mol %, more preferably at least 90 mol %, and even more preferably at least 95 mol %) of the structural unit derived from a dicarboxylic acid is derived from at least one type selected from terephthalic acid, naphthalene dicarboxylic acid, and esters thereof, and of the structural unit derived from a diol, from 5 to 60 mol % (preferably from 15 to 60 mol %) is derived from spiroglycol and from 95 to 40 mol % (preferably from 85 to 40 mol %) is derived from ethylene glycol.

Another example of the amorphous polyester resin is a polyester resin constituted by a structural unit derived from a dicarboxylic acid and a structural unit derived from a diol, in which at least 80 mol % (preferably at least 85 mol %, more preferably at least 90 mol %, and even more preferably at least 95 mol %) of the structural unit derived from a dicarboxylic acid is derived from at least one type selected from terephthalic acid, naphthalene dicarboxylic acid, and esters thereof, and of the structural unit derived from a diol, from 90 to 10 mol % (preferably from 85 to 40 mol %) is derived from 1,4-cyclohexanedimethanol, and from 10 to 90 mol % (preferably from 15 to 60 mol %) is derived from ethylene glycol.

As the polyester resin used in the second embodiment, the polyester resins described in paragraphs [0010] to [0021] of JP 2006-111718 A, the polyester resins described in JP 2017-105873 A, and the polyester resins described in WO 2013/168804 can be referenced, and the contents of the disclosures thereof are incorporated herein.

The polyester resin layer of the present invention may contain other components within a range that does not depart from the spirit of the present invention. Specifically, various additives can be added such as antioxidants, optical stabilizers, UV absorbers, plasticizers, bulking agents, matting agents, dryness adjusting agents, antistatic agents, anti-settling agents, surfactants, flow modifiers, drying oils, waxes, colorants, reinforcing agents, surface smoothing agents, leveling agents, curing reaction accelerators, and thickening agents. For details on the other components, refer to the disclosure in paragraph [0026] of JP 2006-111718 A, the contents of which are incorporated in the present specification.

Layer Containing Polyamide Resin as a Main Component (Barrier Layer)

The polyamide resin included in the layer containing a polyamide resin as a main component includes the polyamide resins (A), (B), and (D) described below, and may further include a polyamide resin (C).

A polyamide resin (A) including a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid;

a polyamide resin (B) including a structural unit derived from a diamine and a structural unit derived from a dicarboxylic acid, 70 mol % or more of the structural unit derived from a diamine being derived from xylylenediamine, and of the structural unit derived from a dicarboxylic acid, from 30 to 65 mol % being derived from an α,ω-linear aliphatic dicarboxylic acid having from 4 to 20 carbons, and from 70 to 35 mol % being derived from isophthalic acid, a total of which does not exceed 100 mol %;

a polyamide resin (C) including a structural unit derived from a diamine and a structural unit derived from a dicarboxylic acid, 70 mol % or more of the structural unit derived from a diamine being derived from hexamethylenediamine, 55 mol % or more of the structural unit derived from a dicarboxylic acid being derived from isophthalic acid, and 15 mol % or more of the structural unit derived from a dicarboxylic acid being derived from terephthalic acid; and (D) an aliphatic polyamide resin.

Here, the term "main component" means that the polyamide resin is the component with the largest content amount amongst components contained in the barrier layer. The amount of the polyamide resin contained in the barrier layer is preferably 80 mass % or more, more preferably 90 mass % or more, even more preferably 95 mass % or more, and yet even more preferably 98 mass % or more.

Polyamide Resin (A)

The polyamide resin (A) is constituted from a structural unit derived from a diamine and a structural unit derived from a dicarboxylic acid, and 70 mol % or more of the structural unit derived from a diamine is derived from xylylenediamine, and more than 90 mol % of the structural unit derived from a dicarboxylic acid is derived from adipic acid.

In the polyamide resin (A), of the structural unit derived from a diamine, preferably 80 mol % or more, more preferably 90 mol % or more, even more preferably 95 mol % or more, and yet even more preferably 99 mol % or more is derived from xylylenediamine. The xylylenediamine is preferably meta-xylylenediamine and para-xylylenediamine, and is more preferably meta-xylylenediamine. An example of a preferred embodiment of the polyamide resin (A) of the present invention is a polyamide resin in which at least 70 mol % of the structural unit derived from a diamine is derived from meta-xylylenediamine.

Examples of diamines besides xylylenediamine that can be used as raw material diamine components of the polyamide resin (A) include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylenediamine, and bis(aminomethyl)naphthalene. One type thereof can be used, or two or more types can be mixed and used.

In a case where a diamine other than xylylenediamine is used as the diamine component, the diamine thereof is used at a proportion of preferably 30 mol % or less, more preferably from 1 to 25 mol %, and particularly preferably from 5 to 20 mol %, of the structural unit derived from a diamine.

In the polyamide resin (A), preferably, not less than 95 mol %, and more preferably not less than 99 mol %, of the structural unit derived from a dicarboxylic acid is derived from adipic acid.

Examples of dicarboxylic acids besides adipic acid preferably used as a raw material dicarboxylic acid component in the polyamide resin (A) include aliphatic dicarboxylic acids such as succinic acid, glutaric acid, pimelic acid, suberic acid, azelaic acid, sebacic acid, undecanedioic acid, and dodecanedioic acid; phthalic acid compounds such as isophthalic acid, terephthalic acid, and orthophthalic acid; and naphthalene dicarboxylic acids, such as isomers of 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types can be mixed and used.

In a case where a dicarboxylic acid other than adipic acid is used as the dicarboxylic acid component, the dicarboxylic acid thereof is used at a proportion of preferably less than 10 mol %, more preferably from 1 to 8 mol %, and particularly preferably from 1 to 5 mol %, of the structural unit derived from a dicarboxylic acid.

Note that the polyamide resin (A) is constituted by a structural unit derived from a diamine and a structural unit derived from a dicarboxylic acid as main components, but does not entirely exclude components other than these, and of course, the polyamide resin may contain a structural unit derived from a lactam such as ε-caprolactam or laurolactam, or from an aliphatic aminocarboxylic acid such as aminocaproic acid and aminoundecanoic acid. Here, "main components" indicates that of the structural unit constituting the polyamide resin (A), the total of the structural unit derived from a diamine and the structural unit derived from a dicarboxylic acid is the largest of all structural unit. In the present invention, the total of the structural units derived from a diamine and structural units derived from a carboxylic acid in the polyamide resin (A) preferably accounts for 90% or more, more preferably 95% or more, and even more preferably 98% or more, of the total structural units.

The number average molecular weight (Mn) of the polyamide resin (A) is preferably 10000 or higher, and more preferably 15000 or higher. The upper limit of the number average molecular weight of the polyamide resin (A) is not particularly established, but may be, for example, 100000 or less, 50000 or less, or even 40000 or less. The number average molecular weight in the present invention is measured in accordance with a method described in paragraph [0016] of WO 2017/090556, the contents of which are incorporated herein.

The polyamide resin (A) is normally a crystalline resin, and the melting point thereof is preferably from 190 to 300° C., more preferably from 200 to 270° C., and even more preferably from 210 to 250° C.

The glass transition temperature of the polyamide resin (A) is preferably from 75° C. to 95° C.

The polyamide resin (A) used in the present invention preferably includes phosphorus atoms at a proportion from 3 to 300 ppm by mass, more preferably from 4 to 250 ppm by mass, and even more preferably from 5 to 200 ppm by mass. Such a configuration tends to provide more excellent moldability of the multilayered article.

Polyamide Resin (B)

The polyamide resin (B) is constituted from a structural unit derived from a diamine and a structural unit derived from a dicarboxylic acid, and at least 70 mol % of the structural unit derived from a diamine is derived from xylylenediamine, and of the structural unit derived from a dicarboxylic acid, from 30 to 65 mol % is derived from α,ω-linear aliphatic dicarboxylic acid having from 4 to 20 carbons, and from 70 to 35 mol % is derived from isophthalic acid (provided that the total does not exceed 100 mol %). By compounding such a polyamide resin, the transparency and oxygen barrier property of the multilayered article can be further improved. The polyamide resin (B) used in the present invention is typically an amorphous polyamide resin. By using an amorphous polyamide resin, transparency of the multilayered article can be further improved.

In the polyamide resin (B), of the structural unit derived from a diamine, 70 mol % or more, preferably 80 mol % or more, more preferably 90 mol % or more, even more preferably 95 mol % or more, and yet even more preferably 99 mol % or more is derived from xylylenediamine. The xylylenediamine is preferably meta-xylylenediamine and para-xylylenediamine, and is more preferably meta-xylylenediamine.

An example of a preferred embodiment of the polyamide resin (B) of the present invention is a polyamide resin in which at least 70 mol % of the structural unit derived from a diamine is derived from meta-xylylenediamine.

Examples of the diamine other than xylylenediamine include aromatic diamines such as para-phenylenediamine, and aliphatic diamines, such as 1,3-bis(aminomethyl)cyclohexane, 1,4-bis(aminomethyl)cyclohexane, tetramethylene diamine, pentamethylene diamine, hexamethylene diamine, octamethylene diamine, and nonamethylene diamine. A single type of these other diamines may be used, or two or more types thereof may be used.

In a case where a diamine other than xylylenediamine is used as the diamine component, the diamine thereof is used at a proportion of preferably 30 mol % or less, more preferably from 1 to 25 mol %, and particularly preferably from 5 to 20 mol %, of the structural unit derived from a diamine.

In the present invention, as described above, of the structural unit derived from a dicarboxylic acid in the polyamide resin (B), from 30 to 65 mol % is derived from an α,ω-linear aliphatic dicarboxylic acid having from 4 to 20 carbons (preferably, an α, ω-linear aliphatic dicarboxylic acid having from 4 to 8 carbons, and more preferably adipic acid), and from 70 to 35 mol % is derived from isophthalic acid.

Of the total dicarboxylic acids constituting the structural unit derived from a dicarboxylic acid in the polyamide resin (B), a lower limit of the proportion of isophthalic acid is not less than 35 mol %, preferably not less than 40 mol %, and more preferably not less than 41 mol %. The upper limit of the proportion of the isophthalic acid is not more than 70 mol %, preferably not more than 67 mol %, more preferably not more than 65 mol %, even more preferably not more than 62 mol %, and yet even more preferably not more than 60 mol %, and may be not more than 58 mol %. Setting the proportion of the isophthalic acid to such a range tends to further improve the oxygen barrier property of the multilayered article of the present invention.

Among the total dicarboxylic acids constituting the structural unit derived from a dicarboxylic acid in the polyamide resin (B), the lower limit of the ratio of α,ω-linear aliphatic dicarboxylic acid having from 4 to 20 carbons (preferably, α,ω-linear aliphatic dicarboxylic acid having from 4 to 8 carbons, and more preferably adipic acid) is not less than 30 mol %, preferably not less than 33 mol %, more preferably not less than 35 mol %, even more preferably not less than 38 mol %, and yet even more preferably not less than 40 mol %, and may even be not less than 42 mol %. The upper limit of the proportion of the α,ω-linear aliphatic dicarboxylic acid having from 4 to 20 carbons is not more than 65 mol %, preferably not more than 60 mol %, and more preferably not more than 59 mol %. Setting the proportion of the isophthalic acid to such a range tends to further improve the oxygen barrier property of the multilayered article of the present invention.

As described above, the α,ω-linear aliphatic dicarboxylic acid having from 4 to 20 carbons is preferably an α,ω-linear aliphatic dicarboxylic acid having from 4 to 8 carbons.

Examples of the α,ω-linear aliphatic dicarboxylic acid having from 4 to 20 carbons that is preferably used as the raw material dicarboxylic acid component of the polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. A single type thereof can be used, or two or more types thereof can be mixed and used. Among these, adipic acid is preferable because the melting point of the polyamide resin is within an appropriate range for molding a multilayered article.

Among the total dicarboxylic acids constituting the structural unit derived from a dicarboxylic acid in the polyamide resin (B), the total proportion of isophthalic acid and the α,ω-linear aliphatic dicarboxylic acid having from 4 to 20 carbons is preferably not less than 90 mol %, more preferably not less than 95 mol %, and even more preferably not less than 98 mol %, and may be 100 mol %. Setting the total proportion of isophthalic acid and the α,ω-linear aliphatic dicarboxylic acid having from 4 to 20 carbons to such a proportion tends to further improve the transparency of the multilayered article of the present invention.

Examples of dicarboxylic acids besides isophthalic acid and the α,ω-linear aliphatic dicarboxylic acid having from 4 to 20 carbons include phthalic acid compounds, such as terephthalic acid and orthophthalic acid; and naphthalene dicarboxylic acids such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types can be mixed and used.

The polyamide resin (B) is preferably substantially free of structural unit derived from terephthalic acid. Substantially free means 5 mol % or less, preferably 3 mol % or less, and even more preferably 1 mol % or less, of the molar amount of isophthalic acid contained in the polyamide resin (B). With such a configuration, suitable moldability of the multilayered article is maintained, and the gas barrier property is less likely to change due to humidity.

Note that the polyamide resin (B) of the present invention is formed from a structural unit derived from a dicarboxylic acid and a structural unit derived from a diamine, but may also include a structural unit besides the structural unit derived from a dicarboxylic acid and the structural unit derived from a diamine, or other moieties such as terminal groups. Examples of other structural units include, but are not limited to, a structural unit derived from lactams, such as ε-caprolactam, valerolactam, laurolactam, and undecalactam, and aminocarboxylic acids, such as 11-aminoundecanoic acid and 12-aminododecanoic acid, and the like. Furthermore, the polyamide resin (B) used in the present invention may include trace amounts of components such as additives used for synthesis. Typically 95 mass % or more, and preferably 98 mass % or more of the polyamide resin (B) used in the present invention is a structural unit derived from a dicarboxylic acid or a structural unit derived from a diamine.

The number average molecular weight (Mn) of the polyamide resin (B) is preferably 8000 or more, and more preferably 10000 or more. The upper limit of the number average molecular weight of the polyamide resin (B) is not particularly established, but may be, for example, not more than 50000, not more than 30000, or not more than 20000. An example of an embodiment of the present invention is an aspect in which the Mn of the polyamide resin (B) is smaller than the Mn of the polyamide resin (A). More preferably, the Mn of the polyamide resin (B) is smaller than the Mn of the polyamide resin (A) by 5000 or more, more preferably smaller by 8000 or more, and even more preferably smaller by 10000 or more.

The glass transition temperature of the polyamide resin (B) is preferably higher than 90° C. but not higher than 150° C., more preferably from 95 to 145° C., even more preferably from 101 to 140° C., and yet even more preferably from 120 to 135° C. Such a configuration tends to further improve the delamination resistance of a multilayered container.

The polyamide resin (B) used in the present invention preferably contains phosphorus atoms at a proportion from 3 to 300 ppm by mass, more preferably from 4 to 250 ppm by mass, even more preferably from 5 to 200 ppm by mass, yet even more preferably from 20 to 100 ppm by mass, and still more preferably from 20 to 50 ppm by mass.

Polyamide Resin (C)

The polyamide resin (C) used in the present invention is a polyamide resin constituted from a structural unit derived from a diamine and a structural unit derived from a dicarboxylic acid, wherein 70 mol % or more of the structural unit derived from a diamine is derived from hexamethylenediamine, 55 mol % or more of the structural unit derived from a dicarboxylic acid is derived from isophthalic acid, and 15 mol % or more of the structural unit derived from a dicarboxylic acid is derived from terephthalic acid. Delamination resistance of the multilayered article can be improved by blending the polyamide resin (C).

In the polyamide resin (C), of the structural unit derived from a diamine, preferably 80 mol % or more, more preferably 90 mol % or more, even more preferably 95 mol % or more, and yet even more preferably 99 mol % or more is derived from hexamethylenediamine. Examples of diamines besides hexamethylene diamine that can be used as the raw material diamine component of the polyamide resin (C) include the xylylenediamine and diamines other than the xylylenediamine described in the section on the polyamide resin (A).

In the polyamide resin (C), at least 55 mol % of structural unit derived from a dicarboxylic acid is derived from isophthalic acid, and the proportion thereof is preferably 60 mol % or more. The proportion of the structural unit derived from isophthalic acid is also preferably not more than 85 mol %, more preferably not more than 80 mol %, and even more preferably not more than 75 mol %.

In addition, in the polyamide resin (C), at least 15 mol % of the structural unit derived from the dicarboxylic acid is derived from terephthalic acid, and the proportion thereof is preferably 20 mol % or more, and more preferably 25 mol % or more. The structural unit derived from terephthalic acid is also more preferably not more than 45 mol %, and even more preferably not more than 40 mol %. In the polyamide resin (C), of the structural unit derived from a dicarboxylic acid, preferably 80 mol % or more, more preferably 90 mol % or more, even more preferably 95 mol % or more, and yet even more preferably 99 mol % or more is constituted by isophthalic acid and terephthalic acid. Examples of dicarboxylic acids other than isophthalic acid and terephthalic acid that are preferable for use as the raw material dicarboxylic acid component of the polyamide resin (C) include the adipic acid and dicarboxylic acids other than adipic acid described in the section on the polyamide resin (A).

Note that the polyamide resin (C) is constituted by a structural unit derived from a diamine and a structural unit derived from a dicarboxylic acid as main components, but does not entirely exclude structural units other than these, and of course, the polyamide resin (C) may contain a structural unit derived from a lactam such as ε-caprolactam or laurolactam, or from an aliphatic aminocarboxylic acid such as aminocaproic acid and aminoundecanoic acid. Here, "main components" indicates that, out of the structural units constituting the polyamide resin (C), a total of the structural units derived from a diamine and the structural units derived from a dicarboxylic acid is the largest of all the structural units. In the present invention, a total of the structural units derived from a diamine and structural units derived from a carboxylic acid in the polyamide resin (C) preferably accounts for 90 mol % or more, more preferably 95 mol % or more, and even more preferably 98 mol % or more, of the total structural units.

Aliphatic Polyamide Resin (D)

The polyamide resin (D) used in the present invention is an aliphatic polyamide resin. Examples of the aliphatic polyamide resin include polyamide 6, polyamide 66, polyamide 10, polyamide 11, polyamide 12, polyamide 46, polyamide 610, polyamide 612, and polyamide 666, and polyamide 6, polyamide 66, and polyamide 666 are preferable, and polyamide 6 is more preferable.

The polyamide 6 referred to here is a polyamide resin having a structural unit derived from a caprolactam as a main component, but may also contain another structural unit within a range that does not depart from the spirit of the present invention. Specific examples thereof include structural units derived from: the xylylenediamine described with regard to the above-described polyamide resin (B), diamines other than xylylenediamine, isophthalic acid, and α,ω-linear aliphatic dicarboxylic acids having from 4 to 20 carbons, or a dicarboxylic acid other than these. The content of these other structural units is preferably not more than 10 mass % and more preferably not more than 5 mass %, of the structural units derived from the caprolactam. The same applies to other aliphatic polyamide resins.

Blending Ratio of Polyamide Resins (A) to (D)

In the barrier layer, the ratio of the mass of the polyamide resin (A) to the total mass of the polyamide resin (B) and the polyamide resin (C) is from 98:2 to 15:85, preferably from 90:10 to 15:85, more preferably from 85:15 to 15:85, and even more preferably from 80:20 to 20:80. By setting the ratio thereof to such a range, delamination resistance of the multilayered article can be further improved. With such a blending ratio, the crystallinity and flexibility of the barrier layer are controlled, an appropriate level of residual stress and impact resistance are imparted to the resulting bottle, and excellent delamination resistance of the bottle is achieved.

In the barrier layer, the total content of the polyamide resin (A) and the polyamide resin (B) is not less than 60 mass %, and more preferably not less than 65 mass %. The upper limit of the total content of the polyamide resin (A) and the polyamide resin (B) is preferably not more than 98 mass %, more preferably not more than 90 mass %, even more preferably not more than 80 mass %, and yet even more preferably not more than 75 mass %. The oxygen barrier property of the multilayered article can be further improved by setting the total content thereof to such a range.

The barrier layer of the present invention preferably includes the polyamide resin (A) in a range from 15 to 90 mass %.

The barrier layer of the present invention includes the polyamide resin (B) in a range from 1 to 65 mass %. The lower limit of the content of the polyamide resin (B) may be 5 mass % or more, or may be 12 mass % or more. The upper limit of the content of the polyamide resin is preferably not more than 60 mass %.

The content of the polyamide resin (C) in the barrier layer is preferably from 0 to 5 mass %.

The barrier layer in the present invention contains the aliphatic polyamide resin (D) in a range from 3 to 40 mass %. The lower limit of the content of the aliphatic polyamide resin (D) is preferably not less than 5 mass %, more preferably not less than 10 mass %, even more preferably not less than 15 mass %, yet even more preferably not less than 20 mass %, and even more preferably not less than 25 mass %. The upper limit of the content of the aliphatic polyamide resin (D) is preferably not more than 35 mass %.

The barrier layer may contain only one each of the polyamide resins (A) to (D), or may contain two or more type of each. In a case where two or more types thereof are contained therein, the total amount is preferably within the range described above.

Furthermore, when the barrier layer includes two or more types of polyamide resins as the polyamide resin (A), the polyamide resin (A) of the largest content amount need only satisfy at least the above-described characteristics such as the glass transition temperature, and preferably, 90 mass % or more of the polyamide resin (A) satisfies the characteristics thereof. The same applies to the polyamide resins (B) to (D).

Note that the polyamide resins contained in the barrier layer may include a polyamide resin other than the polyamide resins (A) to (D) at a proportion of 5 mass % or less of the total of the polyamide resins (A) to (D), and preferably at a proportion from 0 to 3 mass %, and more preferably from 0 to 1 mass %.

Furthermore, it goes without saying that the total amount of the polyamide resins (A) to (D) does not exceed 100 mass %.

In the present invention, of the raw material monomers constituting the polyamide resin included in the barrier layer, a raw material monomer containing an aromatic ring (for example, xylylene diamine, isophthalic acid, and terephthalic acid) is preferably contained at an amount from 30 to 60 mol %, and more preferably from 35 to 55 mol % of the total raw material monomers. In addition, of the raw material monomers constituting the polyamide resin included in the barrier layer, a raw material monomer containing a —$(CH_2)_4$— structure (for example, adipic acid or hexamethylenediamine) is preferably contained at an amount from 70 to 40 mol %, and more preferably from 65 to 45 mol % of the total raw material monomers. With such a configuration, the oxygen barrier properties and the delamination resistance of the multilayered article can be more effectively improved.

Furthermore, of the raw material monomers constituting the polyamide resin included in the barrier layer of the present invention, the ratio of isophthalic acid is preferably from 1 to 40 mol %, and more preferably from 1.5 to 30 mol % of the total raw material monomer. Such a configuration tends to further improve the transparency of the multilayered article.

Other Components

The barrier layer of the present invention may contain additives within a range that does not impair the purpose of the present invention, including: inorganic fillers such as glass fibers and carbon fibers; plate-shaped inorganic fillers such as glass flakes, talc, kaolin, mica, montmorillonite, and organo-modified clay; impact resistance modifiers such as various elastomers; crystal nucleating agents; lubricants such as fatty acid amide-based lubricants and fatty acid amide type compounds; antioxidants such as copper compounds, organic or inorganic halogen-based compounds, hindered phenol-based compounds, hindered amine-based compounds, hydrazine-based compounds, sulfur-based compounds, and phosphorus-based compounds; coloring inhibitors; UV absorbers such as benzotriazole-based UV absorbers; additives such as mold release agents, plasticizers, colorants, and flame retardants; and compounds containing oxidation reaction accelerators, benzoquinones, anthraquinones, and naphthoquinones.

Oxidation Reaction Accelerator

The barrier layer (barrier resin composition) in the present invention may contain an oxidation reaction accelerator. By including an oxidation reaction accelerator, the gas barrier property of the multilayered article can be further enhanced.

The oxidation reaction accelerator may be any substance that exhibits an oxidation reaction promoting effect, but from the perspective of promoting an oxidation reaction of the polyamide resin, a compound containing a transition metal element is preferable. The transition metal element is preferably at least one selected from, of the periodic table of elements, Group VIII transition metals, manganese, copper, and zinc, and from the perspective of effectively expressing an oxygen absorption capacity, the transition metal element is more preferably at least one selected from cobalt, iron, manganese, and nickel, and is even more preferably cobalt.

In addition to use of the abovementioned metal alone, an oxidation reaction accelerator that is in the form of a low-valency oxide, an inorganic acid salt, an organic acid salt, or a complex salt containing the metals described above may be used as such an oxidation reaction accelerator. Examples of the inorganic acid salt include halides such as chlorides or bromides, and carbonates, sulfates, nitrates, phosphates, and silicates. Meanwhile, examples of the organic acid salt include carboxylates, sulfonates, and phosphonates. Moreover, transition metal complexes with β-diketones or β-keto acid esters can also be used.

In particular, in the present invention, from the perspective of favorably expressing an oxygen absorbing capacity, it is preferable to use at least one type selected from carboxylates, carbonates, acetylacetonate complexes, oxides, and halides, which contain the metal atoms described above. It is more preferable to use at least one selected from octanoates, neodecanoates, naphthenates, stearates, acetates, carbonates, and acetylacetonate complexes, and use of cobalt carboxylates such as cobalt octanoate, cobalt naphthenate, cobalt acetate, and cobalt stearate is more preferable.

The oxidation reaction accelerator described above functions not only to promote an oxidation reaction of the polyamide resin, but also as a catalyst for an oxidation reaction of an organic compound having an unsaturated carbon bond or a compound having a secondary or tertiary hydrogen in the molecule. Therefore, in order to further increase oxygen absorption capacity, various compounds in addition to the above-described oxidation reaction accelerator can also be blended in the barrier layer of the present invention. Examples include polymers of unsaturated hydrocarbons such as polybutadiene or polyisoprene, or oligomers thereof, compounds having xylylenediamine as a backbone, or compounds to which a functional group is added to enhance miscibility between the compound and a polyester.

Examples of oxidation reaction accelerators include the transition metal compounds described in paragraphs [0063] to [0066] and the oxidizable organic compounds described in paragraphs [0067] to [0072] of WO 2012/090797, the contents of which are incorporated herein.

When the oxidation reaction accelerator contains a transition metal element, the content thereof in terms of the transition metal concentration in the barrier layer is preferably from 10 to 1000 ppm by mass, more preferably from 20 to 500 ppm by mass, and even more preferably from 40 to 300 ppm by mass, from the perspective of promoting the oxidation reaction of the polyamide resin and increasing the oxygen absorption capacity of a molded product.

The transition metal concentration in the multilayered article can be measured using a known method such as, for example, ICP emission spectroscopy, ICP mass spectrometry, and fluorescent X-ray analysis.

One type of oxidation reaction accelerator may be used alone, or a combination of two or more types may be used. When two or more types are used in combination, the total amount is preferably within the range described above.

Embodiments of the Multilayered Article

A preferable embodiment of the multilayered article of the present invention is multilayered article in which 90 mol % or more of structural unit derived from a diamine in the polyamide resin (A) of the barrier layer is derived from meta-xylylenediamine, of the structural unit derived from a dicarboxylic acid in the polyamide resin (B), from 30 to 65 mol % (preferably from 30 to 59 mol %, and more preferably from 40 to 59 mol %) are derived from adipic acid, and from 70 to 35 mol % (preferably from 70 to 41 mol %, and more preferably from 60 to 41 mol %) are derived from isophthalic acid, and 80 mass % or more (preferably 90 mass % or more) of the aliphatic polyamide resin (D) is polyamide 6.

Through such a configuration, the effect of the present invention is more effectively exhibited.

Layer Configuration

The multilayered article of the present invention is a multilayered article having at least one layer each of a layer containing a polyester resin as a main component (polyester resin layer) and a layer containing a polyamide resin as a main component (barrier layer). The polyester resin layer and the barrier layer are normally in contact.

The number of layers constituting the multilayered article is preferably at least three layers. In the present invention, an aspect including at least two layers of the polyester resin layer and at least one barrier layer is exemplified. In a preferable embodiment of the multilayered article of the present invention, the multilayered article further includes a layer containing a second polyester resin as a main component, and the layer containing a polyester resin as a main component, the layer containing a polyamide resin as a main component, and the layer containing a second polyester resin as a main component are positioned in this order.

More specifically, the number of layers constituting the multilayered article is more preferably from 3 to 10, and even more preferably from 3 to 5.

The number of polyester resin layers in the multilayered container is preferably from 1 to 5, and more preferably from 2 to 4. The number of barrier layers in the multilayered container is preferably from 1 to 3, and more preferably one layer or two layers.

For example, the multilayered container may be made from one polyester resin layer and one barrier layer and have a polyester resin layer/barrier layer configuration (with the polyester resin layer being an inner layer) or a barrier layer/polyester resin layer configuration (with the barrier layer being an inner layer), or may be a three layer configuration of a polyester resin layer/barrier layer/polyester resin layer made from two polyester resin layers and one barrier layer, or may be a five layer configuration of a polyester resin layer/barrier layer/polyester resin layer/barrier layer/polyester resin layer.

From the perspective of obtaining more superior delamination resistance, the barrier layer is preferably arranged at the center or at an inner side, and is more preferably arranged at an inner side. The matter of the "barrier layer is arranged at the center" means that in a cross section of the multilayered article in the thickness direction, the barrier layer is present near the center in the thickness direction. The matter of the "barrier layer is arranged at an inner side" means that in a cross section of the multilayered article in the thickness direction, the barrier layer is present at a position near the inner surface side in the thickness direction. As the position of the barrier layer of the present invention, an aspect in which the intermediate layer is the barrier layer is exemplified in JP 02-229023 A, the contents of which are incorporated herein.

In addition to the polyester resin layer and the barrier layer, the multilayered container of the present invention may also include an optional layer according to the desired performance and the like.

Stretching

The multilayered article of the present invention is preferably stretched. Examples of stretching include biaxial stretch blow molding that is performed when molding a container such as a bottle.

As a preferred embodiment of the stretching of the present invention, a preform (also referred to as a parison) containing a multilayered article of the present invention is biaxially stretched and blow molded. In particular, the stretching preferably includes a step of stretching using a stretch rod and high pressure air. The details of biaxial stretch blow molding will be described later.

Multilayered Container

In the present invention, a multilayered container containing the multilayered article of the present invention is exemplified. The shape of the multilayered container is not particularly limited, and may be, for example, a molded container such as a bottle, a cup, a tube, a tray, or a storage container, or may be a bag-shaped container such as a pouch, a standing pouch, or a zippered storage bag. In the present invention, a bottle is preferable.

Also, it is not necessary for all parts of the bottle to contain the multilayered article of the present invention, and particularly the barrier layer. For example, an aspect is exemplified in which the barrier layer is included in the body section of a bottle, but the barrier layer is not included in the vicinity of the opening (mouth plug section). However, the barrier layer is preferably present up to near the opening of the bottle because such a configuration provides even higher barrier performance.

From the perspective of content storage performance, the volume of the multilayered container of the present invention is preferably from 0.1 to 2.0 L, more preferably from 0.2 to 1.5 L, and even more preferably from 0.3 to 1.0 L. The thickness of the inner layer (polyester resin layer) of the multilayered container of the present invention is preferably not less than 0.01 mm, more preferably not less than 0.03 mm, and even more preferably not less than 0.05 mm, and preferably not more than 2.0 mm, more preferably not more than 1.5 mm, and even more preferably not more than 1.0 mm.

The thickness of the outer layer (polyester resin layer) is preferably not less than 0.01 mm, more preferably not less than 0.03 mm, and even more preferably not less than 0.05 mm, and is preferably not more than 2.0 mm, more preferably not more than 1.5 mm, and even more preferably not more than 1.0 mm.

The thickness of the barrier layer is preferably not less than 0.005 mm, more preferably not less than 0.01 mm, and even more preferably not less than 0.02 mm, and is preferably not more than 0.2 mm, more preferably not more than 0.15 mm, and even more preferably not more than 0.1 mm. When two or more barrier layers are provided, the total of the thicknesses of each barrier layer is preferably the thickness described above.

In addition, when two or more barrier layers are included and an intermediate layer is provided between a barrier layer and another barrier layer, the thickness of the intermediate layer is preferably not less than 0.01 mm, more preferably not less than 0.03 mm or more, and even more preferably not less than 0.05 mm, and is preferably not more than 2.0 mm, more preferably not more than 1.5 mm, and even more preferably not more than 1.0 mm.

The mass of the barrier layer in the multilayered container (in particular, a bottle) of the present invention is preferably from 1 to 20 mass %, more preferably from 2 to 15 mass %, and particularly preferably from 3 to 10 mass %, relative to the total mass of the multilayered container. By setting the mass of the barrier layer to within the range described above, a multilayered container exhibiting a good gas barrier property can be obtained, and molding into the multilayered container from a parison, which is a precursor of the multilayered container, is also facilitated.

The target content to be stored in the multilayered container of the present invention is not particularly limited, and examples include food products, cosmetics, pharmaceuticals, toiletries, mechanical, electrical and electronic components, oils, and resins, and the multilayered container of the present invention can be suitably used particularly as a container for storing food products.

Examples thereof include processed fishery products, processed livestock products, rice, and liquid foods. The multilayered container of the present invention is particularly suitable for storing foods that are easily affected by oxygen. For details thereof, refer to the descriptions in paragraphs [0032] to [0035] of JP 2011-37199 A, the contents of which are incorporated herein.

The food product to be filled into the multilayered container of the present invention is not particularly limited, but specific examples include beverages such as vegetable juice, fruit juice, teas, coffee and coffee beverages, milk and milk beverages, mineral water, ionic beverages, alcoholic beverages, fermented milk beverages, and soy milk; gel foods such as tofu, egg tofus, jellies, puddings, soft adzuki-bean jelly, mousse, yogurts, an apricot bean curd; seasonings such as sauces, soy sauce, ketchup, noodle soup bases, Japanese sauces, vinegar, mirin, dressings, jams, mayonnaise, miso, pickles, and grated spices, etc.; processed meat products such as salami, ham, sausage, yakitori, meatballs, hamburger, grilled pork, and beef jerky; processed fishery products such as kamaboko, shellfish, boiled fish, and tube-shaped fish paste cakes; processed rice products such as rice gruel, cooked rice, rice casserole, and red rice; sauces such as meat sauce, mabo sauce, pasta sauce, curry, stews, and hash sauce; dairy products such as cheese, butter, cream, and condensed milk; processed egg products such as boiled eggs and soft boiled eggs; boiled vegetables and boiled beans; side dishes such as fried foods, steamed foods, stir fry, boiled foods, and baked foods; Japanese pickled vegetables; noodles and pastas such as udon, soba, and spaghetti; and pickled fruit syrups.

Depending on the target content to be stored, the multilayered container may be disinfected or sterilized using ultraviolet rays, electron beams, gamma rays, X-rays, and the like.

Multilayered Article Manufacturing Method

The method for manufacturing the multilayered article of the present invention is not particularly specified, and a well-known method for manufacturing a multilayered article can be adopted.

When the multilayered article is to be manufactured, it is preferable to prepare a polyester resin composition to configure the polyester resin layer and a barrier resin composition to configure the barrier layer (hereinafter, these are collectively referred to as "resin compositions"). The barrier resin composition uses at least three types of polyamide resins including the polyamide resins (A), (B) and (D), but the method for blending the polyamide resins is not particularly limited, and the polyamide resins may be dry-blended and supplied when fabricating a preform for a bottle, or may be melt blended using a single screw extruder, a twin screw extruder, or the like prior to fabricating the preform, or a master batch may be prepared for use by melt blending a portion of the resins. The same applies to a case in which the polyester resin composition contains two or more resins.

Furthermore, when compounding an oxidation reaction accelerator in the barrier layer, the accelerator may be dry blended together with the polyamide resin, or may be formed in a master batch with a portion of the polyamide resin, and then blended, or may be melt-blended.

An appropriate method for manufacturing the multilayered article is selected with consideration of the structure and the like of the molded product containing the multilayered article.

For example, when molding a film or sheet, a resin composition that has been melted through a T die, a circular die, or the like can be extruded from an extruder to manufacture the film or sheet. The obtained film can also be stretched and processed into a stretched film.

Moreover, a bottle shaped package container can be obtained by injecting a molten resin composition into a mold from an injection molding machine to manufacture a preform, and then subjecting the preform to blow stretching (injection blow molding, injection stretch blow molding). Alternatively, a bottle shaped package container can be obtained by blowing, in a mold, a parison obtained by extruding a molten resin composition into the mold from an extruder (direct blow molding).

A container such as a tray or a cup can be molded and obtained by a method of injecting a molten resin composition into a mold from an injection molding machine, or by a molding method such as vacuum molding or pressure molding a sheet.

The multilayered container of the present invention is preferably manufactured by subjecting a preform to biaxial stretch blow molding. The blow molding may be cold parison molding or hot parison molding.

Cold parison molding (two-stage molding) is a molding process in which an injection molded preform is cooled to room temperature and stored, and then reheated with another device and supplied to blow molding. Hot parison molding (one stage molding) is a method of blow molding a parison by preheating at the time of injection molding and adjusting the temperature prior to blowing without completely cooling the parison to room temperature. In hot parison molding, in many cases, an injection molding machine, a temperature control zone, and a blow molding machine are provided in the same molding machine unit, and preform injection molding and blow molding are performed.

A first embodiment of the method for manufacturing a multilayered container of the present invention is an aspect of molding through cold parison molding. The first embodiment of the manufacturing method is described below in accordance with FIG. 1. Of course, the first embodiment is not limited to the configuration depicted in FIG. 1. In FIG. 1, first, a preform 1 is heated ((1) of FIG. 1). Heating is performed using an infrared heater 2 or the like.

Next, the heated preform is biaxially stretched and blow molded. Namely, the preform is placed in a mold 3 ((2) of FIG. 1) and blow molded while being stretched by a stretching rod 4 ((3) and (4) of FIG. 1). Stretching is, for example, a method in which the surface of a preform is heated, after which the preform is stretched axially by a mechanical means such as pressing with a core rod insert, and next, the stretched preform is stretched and blow molded in a transverse direction by blowing with high pressure air of normally from 2 to 4 MPa. Furthermore, in order to improve the heat resistance of the container, stretching may be combined with a blow molding method that increases the crystallinity or reduces residual strain. For example, a method (single blow molding) exists in which the surface of a multilayer preform is heated, after which the preform is blow molded inside a mold of a temperature equal to or higher than the glass transition point. Furthermore, the blow molding method may also be a so-called double blow molding method that includes a primary blow molding step in which the preform is biaxially stretched and blow molded to larger than the final shape, a step in which the primary blow molded product is heated and thermally shrunk to mold a secondary intermediate molded product, and lastly, a secondary blow molding step in which this secondary intermediate molded product is blow molded into a final container shape.

After blow molding, the mold 3 is removed to obtain a multilayered container 5 ((5) in FIG. 1).

A second embodiment of the method for manufacturing a multilayered container of the present invention is an aspect of molding through hot parison molding. In hot parison molding, a parison is blow molded by preheating at the time of injection molding and adjusting the temperature prior to blowing in one stage without completely cooling the parison to room temperature, and the parison is molded without passing through the above-described step of (1) in FIG. 1.

In cold parison molding and hot parison molding, the parison temperature before blow molding is determined with consideration of the glass transition temperatures (Tg) of the polyester resin constituting the polyester resin layer and the polyamide resin constituting the barrier layer. The matter of before blow molding refers to, for example, immediately prior to being blown after passing through a preheating zone. The parison temperature is preferably a temperature more than the glass transition temperature ($Tg_{max}$) of the resin having the highest glass transition temperature among the polyester resin and the polyamide resin constituting the multilayered article of the present invention, and a temperature range of $Tg_{max}$+0.1° C. to 50° C. is more preferable. Furthermore, a difference between the glass transition temperature ($Tg_{min}$) of the resin having the lowest glass transition temperature among the polyester resin and the polyamide resin, and the abovementioned $Tg_{max}$ is preferably not more than 40° C., and more preferably not more than 30° C. When the parison temperature and glass transition temperatures are set to satisfy such ranges, blow moldability tends to further improve.

Furthermore, when the polyester resin and/or the polyamide resin is a crystalline resin, a difference between a lowest temperature ($Tc_{min}$) among the crystallization temperatures (Tc) of the crystalline resins, and the highest temperature ($Tg_{max}$) is preferably large. Specifically, $Tc_{min}$−$Tg_{max}$ is preferably 5° C. or higher, and more preferably 10° C. or higher. An upper limit of 100° C. for $Tc_{min}$−$Tg_{max}$ is practical. When the difference is set to such a range, blow moldability tends to further improve.

In addition, as the method for manufacturing a multilayered container of the present invention, the descriptions of paragraphs [0070]-[0074] of JP 2016-198912, paragraphs [0085] to [0119] of JP 2016-169027, and JP 60-232952 A can be referenced within a range that does not depart from the spirit of the present invention, and the contents thereof are incorporated herein.

EXAMPLES

The present invention is described in greater detail below through examples. The materials, usage amounts, proportions, processing details, processing procedures, and the like described in the examples below may be changed, as appropriate, as long as there is no deviation from the spirit of the present invention. Therefore, the scope of the present invention is not limited to the specific examples described below.
Raw Materials
Polyamide Resin (A): Synthesis of MXD6

A jacketed 50 L reactor equipped with a stirrer, a partial condenser, a cooler, a thermometer, a dripping tank, and a nitrogen gas introduction tube was charged with 15 kg of adipic acid, 13.1 g of sodium hypophosphite monohydrate, and 6.9 g of sodium acetate, and then sufficiently purged with nitrogen and heated to 180° C. under a small nitrogen gas flow to uniformly melt the adipic acid, after which 13.9 kg of meta-xylylenediamine was added dropwise over 170 minutes while the system was stirred. During this time, the internal temperature was continuously increased to 245° C. Note that the water produced by polycondensation was removed from the system through the partial condenser and the cooler. After the completion of dropwise addition of the meta-xylylenediamine, the internal temperature was further increased to 260° C., and the reaction was continued for 1 hour, after which a polymer was removed as a strand from a nozzle at the bottom of the reactor, and cooled with water and then pelletized to obtain a pelletized polymer.

Next, the polymer obtained through the above operation was inserted into a 50 L rotary tumbler equipped with a heating jacket, a nitrogen gas introduction tube, and a vacuum line, and the pressure in the system was reduced while rotating the tumbler, after which the pressure was returned to normal pressure using nitrogen of a purity of 99 vol. % or more. This operation was performed three times. Subsequently, the temperature inside the system was increased to 140° C. under nitrogen circulation. Next, the pressure inside the system was reduced, the temperature in the system was continuously raised to 190° C. and held for 30 minutes at 190° C., after which nitrogen was introduced to return the inside of the system to normal pressure, and then the reaction system was cooled to obtain a polyamide resin (MXD6).

The melting point of the obtained polyamide resin was 237° C., the number average molecular weight was 26000, and the glass transition temperature was 85° C.
Polyamide Resin (B): Synthesis of MXD6I (IPA 50 mol %)

A reaction vessel equipped with a stirrer, a partial condenser, a total condenser, a thermometer, a dropping funnel, a nitrogen gas introduction tube, and a strand die was charged with weighed raw materials including 6001 g (41.06 mol) of adipic acid, 6821 g (41.06 mol) of isophthalic acid, 1.73 g of calcium hypophosphite ($Ca(H_2PO_2)_2$) (30 ppm by mass as a phosphorus atom concentration in the polyamide resin), and 1.11 g of sodium acetate, and then sufficiently purged with nitrogen, after which the reaction vessel was filled with nitrogen to an internal pressure of 0.4 MPa, and the inside of the system was heated to 190° C. while stirring under a small nitrogen gas flow. The molar ratio of sodium acetate/calcium hypophosphite was 1.33.

To this, 11185 g (82.12 mol) of meta-xylylenediamine was added dropwise under stirring, and the temperature inside the system was continuously increased while removing condensed water that was produced, to outside of the system. After dropwise addition of the meta-xylylenediamine was completed, the internal temperature was increased, and when the temperature reached 265° C., the pressure inside the reaction vessel was reduced. The internal temperature was then further increased, and a melt polycondensation reaction was continued for 10 minutes at 270° C. Subsequently, the inside of the system was pressurized with nitrogen, and the obtained polymer was removed from the strand die and pelletized to obtain approximately 21 kg of polyamide resin pellets (MXD6I (IPA 50 mol %). The obtained polyamide resin (MXD6I (IPA 50 mol %)) was vacuum dried at 115° C. for 24 hours.

It was found that the resin (MXD6I) had a crystal melting enthalpy ΔHm of substantially 0 J/g in the process of increasing the temperature, and was amorphous. The number average molecular weight was 13500. The Tg was 127° C.

Polyamide resin (C): PA6I/6T: Grivory G21, available from EMS-CHEMIE AG, molar ratio of isophthalic acid to terephthalic acid of 2:1. Amorphous, glass transition temperature: 125° C.

Polyamide resin (D): PA6, UBE Nylon 1022B, available from Ube Industries, Ltd.

Polyester resin: Unipet BK2180, available from Mitsubishi Chemical Corporation, melting point of 248° C., glass transition temperature of 75° C., and inherent viscosity=0.83 dL/g. At the time of use, a material that had been dried in a dehumidifying dryer at 150° C. for 8 hours was used. The inherent viscosity was measured using an Ubbelohde-type viscometer with the polyester resin dissolved in a mixed solvent of phenol/1,1,2,2-tetrachloroethane=6/4 (mass ratio) and maintained at 25° C.

Oxidation reaction accelerator: cobalt (II) stearate, available from Kanto Chemical Co., Ltd.

Measurements of Glass Transition Temperature and Melting Point, and Crystal Melting Enthalpy Differential scanning calorimetry measurements were carried out in accordance with JIS K7121 and K7122 using a differential scanning calorimeter. A differential scanning calorimeter was used to perform measurements. The resin pellets were crushed and placed into a measurement pan of the differential scanning calorimeter, and then pretreated by increasing the temperature to 300° C. at a temperature increase rate of 10° C./min under a nitrogen atmosphere, followed by rapid cooling, after which the measurements were performed. As the measurement conditions, the temperature was increased to 300° C. at a temperature increase rate of 10° C./min, and then maintained at 300° C. for 5 minutes, after which the temperature was reduced to 100° C. at a temperature decrease rate of −5° C./min, and measurements were then carried out to determine the glass transition temperature (Tg), the melting point (Tm), and the crystal melting enthalpy (ΔHm).

As the differential scanning calorimeter, the "DSC-60" available from Shimadzu Corporation was used.

Manufacture of Multilayered Bottles in Examples 1 to 8 and Comparative Examples 1 to 3
Manufacture of Preform An injection molding machine with two injection cylinders (model SE-130DU-CI, available from Sumitomo Heavy Industries, Ltd.), and a two-piece multilayered hot runner mold (available from Kortec, Inc.) were used to produce a preform partially having a three-layer structure of (Y)/(X)/(Y) under the conditions indicated below.

Specifically, first, as the material constituting the layer (Y), a polyester resin was injected from one of the injection cylinders, and while the injection state of the layer (Y) was maintained, a resin mixture obtained by dry blending the various polyamide resins shown in the table, and also cobalt (II) stearate (available from Kanto Chemical Co., Ltd.) as an oxidation reaction accelerator in Example 2, was injected as the material constituting the layer (X) that becomes the barrier layer, from the other injection cylinder along with the polyester resin constituting the layer (Y). Lastly, a necessary amount of the polyester resin constituting the layer (Y) was injected to fill the cavity, and thereby a preform (25 g) partially having a three-layer structure of (Y)/(X)/(Y) was obtained (preform of the shape indicated by reference numeral 1 in FIG. 1). The size of the preform included an overall length of 92 mm, an outer diameter of 22 mm, and a wall thickness of 3.9 mm.

Skin-side injection cylinder temperature: 285° C.
Core-side injection cylinder temperature: 265° C.
Resin flow path temperature in mold: 290° C.
Mold cooling water temperature: 15° C.
Cycle time: 33 s
Proportion of resin mixture constituting the barrier layer in the preform: 5 mass %

Manufacture of Multilayered Bottles

Petaloid-type bottles were obtained by biaxially stretching and blow molding the obtained preforms using a twin screw stretch blow molding device (model EFB1000ET, available from Frontier Inc.). The overall length of each bottle was 223 mm, the outer diameter was 65 mm, and the internal volume was 500 mL (surface area: 0.04 m², body section average thickness: 0.33 mm), and the bottom part was petaloid shaped. No dimples were provided in the body section. The biaxial stretch blow molding conditions were as indicated below. The proportion of the layer (X) with respect to the total mass of the obtained bottle was 5 mass %.

Preform heating temperature: 110° C.
Primary blow pressure: 0.9 MPa
Secondary blow pressure: 2.5 MPa
Primary blow delay time: 0.30 sec
Primary blow time: 0.30 sec
Secondary blow time: 2.0 sec
Blow exhaust time: 0.6 sec
Mold temperature: 30° C.

Blow Moldability of the Bottle

The blow moldability of the obtained bottles was visually evaluated as follows.

A: Cloudiness was not observed in any part of the entire bottle, and the bottle exhibited excellent transparency and permeability.

B: Slight cloudiness was observed in a portion of the bottle, but a good product was obtained by changing the heating temperature.

C: Slight cloudiness was observed throughout the entire bottle, and a good product was not obtained even by changing the heating temperature.

D: Significant cloudiness was observed in a portion of the bottle, and slight cloudiness was observed in all other portions of the bottle.

E: Bursting was observed with significant cloudiness in the entire bottle.

Oxygen Barrier Property of the Bottle

An oxygen permeability measuring device (product name "OX-TRAN 2/61", available from MOCON Inc.) was used.

The bottles produced in the Examples and Comparative Examples were each filled with 100 mL of water, and under conditions of an oxygen partial pressure of 0.21 atm, a bottle internal humidity of 100% RH (relative humidity), an external humidity of 50% RH, and a temperature of 23° C., nitrogen at 1 atm was circulated inside the bottle at 20 mL/min, and the amount of oxygen included in the nitrogen after circulating inside the bottle for 200 hours was detected using a coulometric sensor, and thereby the oxygen permeability was measured.

S: 0.008 cc/(bottle·day·0.21 atm) or less
A: More than 0.008 cc/(bottle·day·0.21 atm) and less than or equal to 0.015 cc/(bottle·day·0.21 atm)
B: More than 0.015 cc/(bottle·day·0.21 atm) and less than or equal to 0.020 cc/(bottle·day·0.21 atm)
C: More than 0.020 cc/(bottle·day·0.21 atm) and less than or equal to 0.040 cc/(bottle·day·0.21 atm)
D: More than 0.040 cc/(bottle·day·0.21 atm)

Bottle Delamination Resistance

The delamination resistance of each of the obtained multilayered bottles was evaluated as follows.

First, each of the bottles obtained in the Examples and Comparative Examples was filled with 500 mL of colored carbonated water (4.2 gas volume), and capped, after which the bottles were allowed to sit for 48 hours at 23° C. Next, the bottles were then dropped horizontally from a height of 1 m so that the body section came into contact with the floor. The delaminated locations became cloudy and could be visually distinguished, and therefore the presence or absence of delamination of the bottles was determined visually. Note that every bottle for which delamination occurred even partially was identified as a delaminated bottle. The number of test bottles was five, and a value obtained by averaging the number of drop times until delamination occurred was used.

A: The number of drop times was 100 or more.
B: The number of drop times was from 50 to 99.
C: The number of drop times was from 20 to 49.
D: The number of drop times was 19 or fewer.

Bottle Appearance (Transparency)

The obtained 3-layer bottles were visually observed, and the appearance was evaluated as follows.

A: Cloudiness was not observed in any part of the entire bottle, and the bottle exhibited excellent transparency and permeability.
C: Slight cloudiness was observed throughout the entire bottle.
E: Significant cloudiness was observed throughout the entire bottle.

The results are shown in Table 1.

TABLE 1

| | | | Example 1 | Example 2 | Example 3 | Example 4 | Example 5 | Example 6 |
|---|---|---|---|---|---|---|---|---|
| | PET Layer Ratio | mass % | 95 | 95 | 95 | 95 | 95 | 95 |
| | Barrier Layer Ratio | mass % | 5 | 5 | 5 | 5 | 5 | 5 |
| Barrier Layer Composition | Polyamide resin (A) MXD6; crystalline PA | mass % | 90 | 70 | 55 | 45 | 30 | 15 |
| | Polyamide resin (B) MXD6I; amorphous PA | mass % | 3 | 10 | 15 | 25 | 40 | 55 |
| | Polyamide resin (C) PA6I/6T | mass % | 0 | 0 | 0 | 0 | 0 | 0 |
| | Polyamide resin (D) PA6; aliphatic PA | mass % | 7 | 20 | 30 | 30 | 30 | 30 |
| | Oxidation reaction accelerator | ppm by mass | 0 | 0 | 0 | 0 | 0 | 0 |
| Bottle Moldability | Blow Moldability | — | A | A | A | A | A | A |
| Physical Properties of Bottle | Oxygen barrier property OTR | cc/bottle/day/(0.21 atm) | A | B | B | B | B | B |
| | Delamination resistance | — | B | A | A | A | A | A |
| | Bottle appearance | — | B | B | A | A | A | A |

| | | | Example 7 | Example 8 | Comparative Example 1 | Comparative Example 2 | Comparative Example 3 |
|---|---|---|---|---|---|---|---|
| | PET Layer Ratio | mass % | 95 | 95 | 95 | 95 | 95 |
| | Barrier Layer Ratio | mass % | 5 | 5 | 5 | 5 | 5 |
| Barrier Layer Composition | Polyamide resin (A) MXD6; crystalline PA | mass % | 55 | 45 | 100 | 70 | 55 |
| | Polyamide resin (B) MXD6I; amorphous PA | mass % | 15 | 20 | 0 | 0 | 0 |
| | Polyamide resin (C) PA6I/6T | mass % | 0 | 5 | 0 | 0 | 15 |
| | Polyamide resin (D) PA6; aliphatic PA | mass % | 30 | 30 | 0 | 30 | 30 |
| | Oxidation reaction accelerator | ppm by mass | 200 | 0 | 0 | 0 | 0 |
| Bottle Moldability | Blow Moldability | — | A | A | A | B | A |
| Physical Properties of Bottle | Oxygen barrier property OTR | cc/bottle/day/(0.21 atm) | A | B | A | C | C |
| | Delamination resistance | — | A | A | C | B | A |
| | Bottle appearance | — | A | A | A | C | C |

As is clear from the above results, the bottles of the present invention excelled in oxygen barrier properties, transparency, and delamination resistance (Examples 1 to 8). The bottles of the present invention also excelled in blow moldability.

In contrast, when only MXD6 was used as the polyamide resin used in the barrier layer (Comparative Example 1), the barrier property, transparency, and blow moldability were excellent, but the delamination resistance was inferior.

Furthermore, when an aliphatic polyamide resin was compounded in MXD6 (Comparative Example 2), the oxygen barrier property and transparency were inferior.

On the other hand, when PA6I/6T was used instead of MXD6I (Comparative Example 3), delamination resistance was excellent, but the oxygen barrier property and transparency were inferior.

REFERENCE SIGNS LIST

1 Preform
2 Heater
3 Mold
4 Stretching rod
5 Multilayered container

The invention claimed is:

1. A multilayered article comprising a layer containing a polyester resin as a main component and a layer containing a polyamide resin as a main component, the layer containing the polyester resin as a main component being in direct contact with the layer containing the polyamide resin as a main component,
the polyester resin including a structural unit derived from a dicarboxylic acid and a structural unit derived from a diol in which at least 80 mol % of the structural unit derived from a dicarboxylic acid is derived from at least one type selected from terephthalic acid and esters thereof, and at least 80 mol % of the structural unit derived from a diol is derived from ethylene glycol;
the polyamide resin included in the layer containing a polyamide resin as a main component comprising:
a polyamide resin (A) including a structural unit derived from a diamine and a structural unit derived from a dicarboxylic acid, 70 mol % or more of the structural unit derived from a diamine being derived from xylylenediamine, and more than 90 mol % of the structural unit derived from a dicarboxylic acid being derived from adipic acid; and
a polyamide resin (B) including a structural unit derived from a diamine and a structural unit derived from a dicarboxylic acid, 70 mol % or more of the structural unit derived from a diamine being derived from xylylenediamine, and of the structural unit derived from a dicarboxylic acid, from 40 to 60 mol % being derived from an α,ω-linear aliphatic dicarboxylic acid having from 4 to 20 carbons, and from 60 to 40 mol % being derived from isophthalic acid, a total of which does not exceed 100 mol %;
the polyamide resin included in the layer containing a polyamide resin as a main component comprising or not comprising:
a polyamide resin (C) including a structural unit derived from a diamine and a structural unit derived from a dicarboxylic acid, 70 mol % or more of the structural unit derived from a diamine being derived from hexamethylenediamine, 55 mol % or more of the structural unit derived from a dicarboxylic acid being derived from isophthalic acid, and 15 mol % or more of the structural unit derived from a dicarboxylic acid being derived from terephthalic acid; and
the polyamide resin included in the layer containing a polyamide resin as a main component comprising:
an aliphatic polyamide resin (D),
wherein in the layer containing a polyamide resin as a main component, a ratio of a mass of the polyamide resin (A) to a total mass of the polyamide resin (B) and the polyamide resin (C) is from 98:2 to 15:85 and a mass ratio of the polyamide resin (A) to a mass of the polyamide resin (B) is from 55/15 to 15/55; and
a total content of the polyamide resin (A) and the polyamide resin (B) is not less than 60 mass % of the layer containing a polyamide resin as a main component, a content of the polyamide resin (B) is from 1 to 65 mass % of the layer containing a polyamide resin as a main component, and a content of the aliphatic polyamide resin (D) is from 3 to 40 mass % of the layer containing a polyamide resin as a main component.

2. The multilayered article according to claim 1, wherein the aliphatic polyamide resin (D) includes polyamide 6.

3. The multilayered article according to claim 1, wherein at least 70 mol % of the structural unit derived from a diamine in the polyamide resin (A) is derived from meta-xylylenediamine.

4. The multilayered article according to claim 1, wherein, of the structural unit derived from a dicarboxylic acid in the polyamide resin (B), from 40 to 60 mol % is derived from adipic acid.

5. The multilayered article according to claim 1, wherein, of the structural unit derived from a dicarboxylic acid in the polyamide resin (B), from 40 to 59 mol % is derived from adipic acid, and from 60 to 41 mol % is derived from isophthalic acid.

6. The multilayered article according to claim 1, wherein the polyamide resin (B) is an amorphous polyamide resin.

7. The multilayered article according to claim 6, wherein,
at least 90 mol % of the structural unit derived from a diamine in the polyamide resin (A) is derived from meta-xylylenediamine,
of the structural unit derived from a dicarboxylic acid in the polyamide resin (B), from 40 to 60 mol % is derived from adipic acid, and
80 mass % or more of the aliphatic polyamide resin (D) is polyamide 6.

8. The multilayered article according to claim 6, further comprising a layer containing a second polyester resin as a main component, the multilayered article including
the layers positioned in an order of the layer containing a polyester resin as a main component, the layer containing a polyamide resin as a main component, and the layer containing a second polyester resin as a main component.

9. The multilayered article according to claim 6, wherein the multilayered article is stretched.

10. The multilayered article according to claim 1, wherein,
at least 90 mol % of the structural unit derived from a diamine in the polyamide resin (A) is derived from meta-xylylenediamine,
of the structural unit derived from a dicarboxylic acid in the polyamide resin (B), from 40 to 60 mol % is derived from adipic acid, and
80 mass % or more of the aliphatic polyamide resin (D) is polyamide 6.

11. The multilayered article according to claim 10, further comprising a layer containing a second polyester resin as a main component, the multilayered article including
the layers positioned in an order of the layer containing a polyester resin as a main component, the layer containing a polyamide resin as a main component, and the layer containing a second polyester resin as a main component.

12. The multilayered article according to claim 10, wherein the multilayered article is stretched.

13. The multilayered article according to claim 1, further comprising a layer containing a second polyester resin as a main component, the multilayered article including
the layers positioned in an order of the layer containing a polyester resin as a main component, the layer containing a polyamide resin as a main component, and the layer containing a second polyester resin as a main component.

14. The multilayered article according to claim 13, wherein the multilayered article is stretched.

15. The multilayered article according to claim 1, wherein the multilayered article is stretched.

16. A multilayered container comprising the multilayered article as in claim 1.

17. The multilayered container according to claim 16, wherein the container is a bottle.

18. The multilayered container according to claim 16, wherein the polyamide resin (B) is an amorphous polyamide resin.

19. The multilayered container according to claim 16, wherein at least 90 mol % of the structural unit derived from a diamine in the polyamide resin (A) is derived from meta-xylylenediamine,
of the structural unit derived from a dicarboxylic acid in the polyamide resin (B), from 40 to 60 mol % is derived from adipic acid, and
80 mass % or more of the aliphatic polyamide resin (D) is polyamide 6.

20. The multilayered container according to claim 16, further comprising a layer containing a second polyester resin as a main component, the multilayered article including
the layers positioned in an order of the layer containing a polyester resin as a main component, the layer containing a polyamide resin as a main component, and the layer containing a second polyester resin as a main component.

* * * * *